(12) United States Patent
Tsironis

(10) Patent No.: US 12,500,325 B1
(45) Date of Patent: Dec. 16, 2025

(54) WAVEGUIDE TUNER WITH SIGNAL COUPLER-DIVIDER

(71) Applicant: Christos Tsironis, Kirkland (CA)

(72) Inventor: Christos Tsironis, Kirkland (CA)

( * ) Notice: Subject to any disclaimer, the term of this patent is extended or adjusted under 35 U.S.C. 154(b) by 477 days.

(21) Appl. No.: 17/966,757

(22) Filed: Oct. 14, 2022

(51) Int. Cl.
  *H01P 5/04* (2006.01)
  *G01R 27/32* (2006.01)
  *H01P 5/18* (2006.01)

(52) U.S. Cl.
  CPC .............. *H01P 5/182* (2013.01); *G01R 27/32* (2013.01); *H01P 5/04* (2013.01)

(58) Field of Classification Search
  CPC ... H03H 7/38; H01P 3/023; H01P 5/12; H01P 5/18; H01P 5/181; H01P 5/182; H01P 5/04; H01P 5/00; G01R 27/32; G01R 27/04; G01R 31/2822; G01R 31/282; G01R 31/2601; G01R 1/26; G01R 1/24; G01R 35/005
  USPC ......................................................... 333/253
  See application file for complete search history.

(56) References Cited

U.S. PATENT DOCUMENTS

| 7,282,926 | B1 | 10/2007 | Verspecht et al. | |
| 9,921,253 | B1 | 3/2018 | Tsironis | |
| 11,137,439 | B1 | 10/2021 | Tsironis | |
| 11,233,307 | B1 * | 1/2022 | Tsironis | H01P 5/183 |

OTHER PUBLICATIONS

Load Pull for Power Devices [online], Microwaves 101 [retrieved on Mar. 14, 2017]. Retrieved from Internet <URL: https://www.microwaves101.com/encyclopedias/load-pull-for-power-devices>.
"Computer Controlled Microwave Tuner", Product Note 41, Focus Microwaves, Jan. 1998.
S-parameters [online], Microwaves 101 [retrieved on Apr. 28, 2020]. Retrieved from Internet <URL: https://www.microwaves101.com/encyclopedias/s-parameters>.
W-band Programmable Tuner Model 11075, product note 43, Aug. 1997, Focus Microwaves.
Directional Couplers [online], Microwaves 101 [retrieved on Oct. 17, 2018]. Retrieved from Internet <URL: http://www.microwaves101.com/encyclopedia/directionalcouplers.cfm>.
6-8 dB Coaxial Directional Couplers to 40 GHz [online], PULSAR Microwave Corp., [retrieved May 23, 2022]. Retrieved from Internet <URL: https://www.pulsarmicrowave.com/products/directional_couplers?src=gcpc&gclid=CjwKCAjw4ayUBhA4EiwATWyBrm8rLbT9CZXL9TVKSS9-VaMKnoOCOr8ScBFJ8W7e_QBFJaEe8wFRIhoCXfgQAvD_BwE>.
"A Note on Coaxial Bethe-Hole Directional Couplers", in Proceedings of the IRE, https://ieeexplore.ieee.org/abstract/document/1701224.

* cited by examiner

*Primary Examiner* — Andrea Lindgren Baltzell
*Assistant Examiner* — Abigail Amir Yaldo

(57) ABSTRACT

Low loss high directivity signal coupler-dividers use two additional waveguide sections coupled using traversing holes with a main waveguide section, which carries a longitudinal slot, into which a metallic tuning probe is inserted and precisely positioned. The coupler-divider allows vector load pull and sampling a portion of the signal to amplify and inject back through the tuner section to create a compact hybrid tuner for sub-THz tuning frequencies.

10 Claims, 15 Drawing Sheets

FIG. 1: Prior art

WAVEGUIDE TUNER WITH SIGNAL COUPLER-DIVIDER

PRIORITY CLAIM

Not Applicable

CROSS-REFERENCE TO RELATED ARTICLES

1. Load Pull for Power Devices [online], Microwaves101 [retrieved on 2017-03-14]. Retrieved from Internet <URL: https://www.microwaves101.com/encyclopedias/load-pull-for-power-devices>.
2. "Computer Controlled Microwave Tuner", Product Note 41, Focus Microwaves, January 1998.
3. S-parameters [online], Microwaves101 [retrieved on 2020-04-28]. Retrieved from Internet <URL: https://www.microwaves101.com/encyclopedias/s-parameters>.
4. W-band Programmable Tuner Model 11075, product note 43, August 1997, Focus Microwaves.
5. Directional Couplers [online], Microwaves101 [retrieved on 2018-10-17]. Retrieved from Internet <URL: http://www.microwaves101.com/encyclopedia/directionalcouplers.cfm>.
6. 6-8 dB Coaxial Directional Couplers to 40 GHz [online], PULSAR Microwave Corp., [retrieved 2022-05-23]. Retrieved from Internet <URL: https://www.pulsarmicrowave.com/products/directional_couplers?src=gcpc&gclid=CjwKCAjw4ayUBhA4EiwATWyBrm8rLbT9CZXL9TVKSS9-VaMKnoOCOr8ScBFJ8W7e_QBFJaEe8wFRlhoCXfgQAvD_BwE>.
7. "A Note on Coaxial Bethe-Hole Directional Couplers", in Proceedings of the IRE, https://ieeexplore.ieee.org/abstract/document/1701224.
8. VERSPECHT, J. et al. U.S. Pat. No. 7,282,926, "Method and an apparatus for characterizing a High-Frequency Device-Under-Test in a Large Signal Impedance.
9. Tsironis, C., U.S. Pat. No. 11,137,439, "Hybrid Load and Source tuner using digital active loop", FIG. 5.
10. Tsironis, C., U.S. Pat. No. 9,921,253, "Method for reducing power requirements in active load pull system".

FIELD OF THE INVENTION

This invention relates to testing of microwave two-ports (transistors, device under test (DUT)) using linear and non-linear measurement techniques especially under controlled impedance conditions at the input and output of the transistors (Load Pull measurement, see ref. 1) and also measuring and analyzing the large signal behavior of a DUT.

BACKGROUND OF THE INVENTION

A popular method for testing and characterizing microwave transistors at high power nonlinear operation is "load pull" and "source pull" (see ref. 1). Load pull or source pull are measurement techniques employing microwave tuners (see ref. 2) and other microwave test equipment. There are basically two types of load pull: scalar and vector load pull. In scalar load pull the amplitude of the incoming and outgoing signal is measured. The method is restricted to the frequency domain. In vector load pull one measures amplitude and phase of the forward and reverse propagating signals, in the frequency domain. If the detectors (via the couplers) can detect also harmonic signal components, then a transfer to the time domain is possible using inverse Fourier transformation. The microwave tuners in particular are used to manipulate the microwave impedance conditions under which the Device Under Test—DUT is tested (FIG. 1). Directional signal couplers are needed to detect the signal waves propagating along the coaxial or waveguide transmission line towards <a> and away <b> from the DUT (FIG. 1) and to allow performing harmonic Fourier analysis in order to reconstruct the real-time non-linear transistor response. Further-on the instantaneous voltage-current trajectory of a transistor, typically called the "load-line", (see ref. 8) will depend on the complex impedance presented to the transistor using harmonic tuners (see ref. 9). A setup that allows this test is a "harmonic load pull setup" as shown in FIG. 1.

DESCRIPTION OF PRIOR ART

A waveguide load pull tuner (see ref. 4), is based on a waveguide transmission line; as such it can only control a fundamental frequency and not any harmonic frequencies. It is known that waveguides transmit signal power in various "modes", i.e., configurations of the electric and magnetic fields. In the basic exploitable TEM01 mode we are dealing with here, the useful bandwidth of the waveguide does not exceed one octave i.e., Fmax/Fmin<2. It is therefore impossible to perform harmonic tuning using waveguide tuners. The tuners are made by cutting a longitudinal slot into one wall of a piece of waveguide, preferably in the center of a broad wall, and insert a conductive tuning probe. Inserting the probe further increases the amount of reflected energy and therefore the amplitude of the reflection factor, moving the probe along the waveguide changes the distance to a reference port and therefore controls the phase. Moving over one half of a wavelength covers 360 degrees of reflection phase and inserting the probe quasi until the opposite internal waveguide wall covers a reflection amplitude up to almost 1 (FIG. 13). All together the whole Smith chart is covered, allowing full impedance control (see ref. 4).

Signal couplers are three- or more-port devices that sample a portion of the signal power traversing from an input to an output port and deliver it to a test instrument to be able to carry out measurements without disturbing much the main signal transfer. Directional signal couplers have been known (see ref. 5, 7); They detect forward <a> and reverse <b> travelling waves on the transmission line and transfer the measured data to the vector network analyzer (VNA, FIG. 1). In order for the data to be valid, the couplers must be calibrated by measuring their scattering (s-) parameters before (see ref. 3) and de-embed to the DUT reference plane. Typical s-parameter calibration occurs under characteristic impedance (50Ω) termination conditions. However, when the terminations are non-50Ω, as shown in FIG. 2, the signal sampling behavior, forward $C(\Gamma 2)$ (coupling) and reverse $I(\Gamma 2)$ (isolation) and divided $D(\Gamma 2)$ change. The signal detected at the coupled port comes from both the input port and, as part of the signal returning from a non-50Ω termination ($\Gamma 2$), at the output port. In load pull operations in particular the tuners create (on purpose) non-50Ω test conditions. The relation describing this phenomenon using 4-port s-parameters is:

$$C(\Gamma 2)=S31+S32*S21*\Gamma 2/(1-\Gamma 2*S22)\approx S31+S32*\Gamma 2 \quad \{\text{eq. 1}\}$$

$$I(\Gamma 2)=S41+S42*S21*\Gamma 2/(1-\Gamma 2*S22)\approx S41+S42*\Gamma 2 \quad \{\text{eq. 2}\}$$

whereby $\Gamma 2$ is the reflection created by the tuner at port 2 and $C(\Gamma 2)$ and $I(\Gamma 2)$ are the new values of the transmission S31 and isolation S41 between port 1 and ports 3 and 4 or the ratio of signal power detected at ports 3 and 4 divided by the injected signal power into port 1 (FIG. 2).

The Directivity is a coupler property defined as S31/S41=S42/S32, depending which port, 1 or 2, is defined as the input port. If Γ2=0 then C(0)=S31 and I(0)=S41 as follows from {eq.1, 2}. The important quantities are S32 and Γ2, that is the isolation and the load reflection factor; since |S21|≈1, and |S22|≈0 it is, finally, the product Γ2*S32 that determines the sensitivity of the coupling factor on the mismatch created by the tuner. An ideal directivity coupler should therefore have a Directivity of infinite, or S41=S32=0. This not being possible, "Directivity" is a key and distinguishing performance of any directional coupler, especially when used in a non-50Ω, i.e., |Γ2|>0 test environment as shown in FIGS. 1, 2 and 3. Commercially available compact wideband couplers (see ref. 6) have Directivity values between 10 and 20 dB. The coupler presented here is simpler to make, is extremely wideband and exceeds this level of Directivity. Signal couplers can be made for coaxial transmission media (see ref. 6), as well for waveguide transmission media for couplers (see ref. 7) and tuners (see ref. 4). This invention deals with waveguide transmission media.

BRIEF DESCRIPTION OF THE INVENTION

Signal couplers are in general bi-directional, i.e., the traveling signal waves are detected on their way from the DUT and towards the DUT (FIG. 1). The forward detecting port is called "coupled" port; the reverse coupled port is called "isolated" port (FIG. 2). When the isolated port is terminated with the characteristic impedance of the transmission media, i.e., when no signal is reflected back into the coupler, the coupler is called a "directional" coupler, because the only processable portion of the detected signal comes from one direction (forward). Waveguide couplers are created by attaching the walls of waveguide transmission lines to each-other and drill holes 53, 54 of various shapes (FIGS. 6A to 6C) into the adjacent walls (FIG. 5, 7) to allow electro-magnetic coupling by "leaking" signal energy from the main waveguide transmission line to one or more adjacent secondary transmission lines. Of course, because the couplers are by nature bi-directional, in reverse direction, i.e., when port 2 is the input port, the isolated port becomes the coupled port, and the coupled port becomes the isolated port. The couplers dealt with in this disclosure are bi-directional couplers. In some cases, the sampled signal is needed to drive a feedback network, as well as to be measured by a vector network analyzer (VNA), see FIG. 3, in order to perform active or hybrid vector load pull. The needed signal portion to drive the feedback signal injection <a"> is provided by a 5$^{th}$ port, the "divided" port of the signal coupler (FIG. 2). In waveguide structures this is made by coupling a further waveguide with the main transmission waveguide media (FIG. 4, 7).

BRIEF DESCRIPTION OF THE SEVERAL VIEWS OF THE DRAWINGS

The invention and its mode of operation will be more clearly understood from the following detailed description when read with the appended drawings in which:

FIG. 10A depicts the overall structure; FIG. 10B depict the detail of the tuning section.

DETAILED DESCRIPTION OF THE INVENTION

Figure 7:
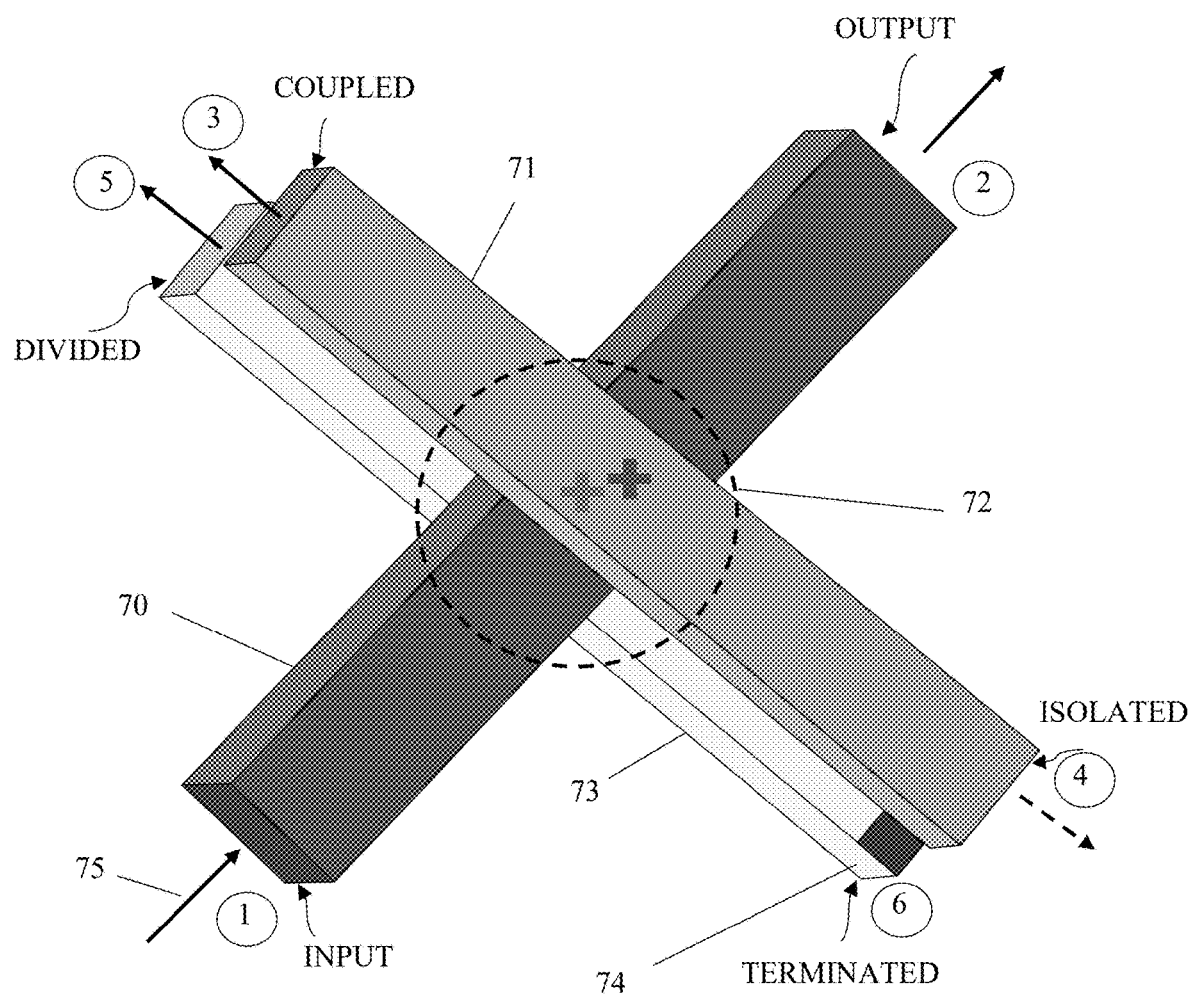
FIG. 7 depicts an embodiment of coupler-divider using back-to-back joined waveguides on both sides of the main waveguide section.
Figure 8:
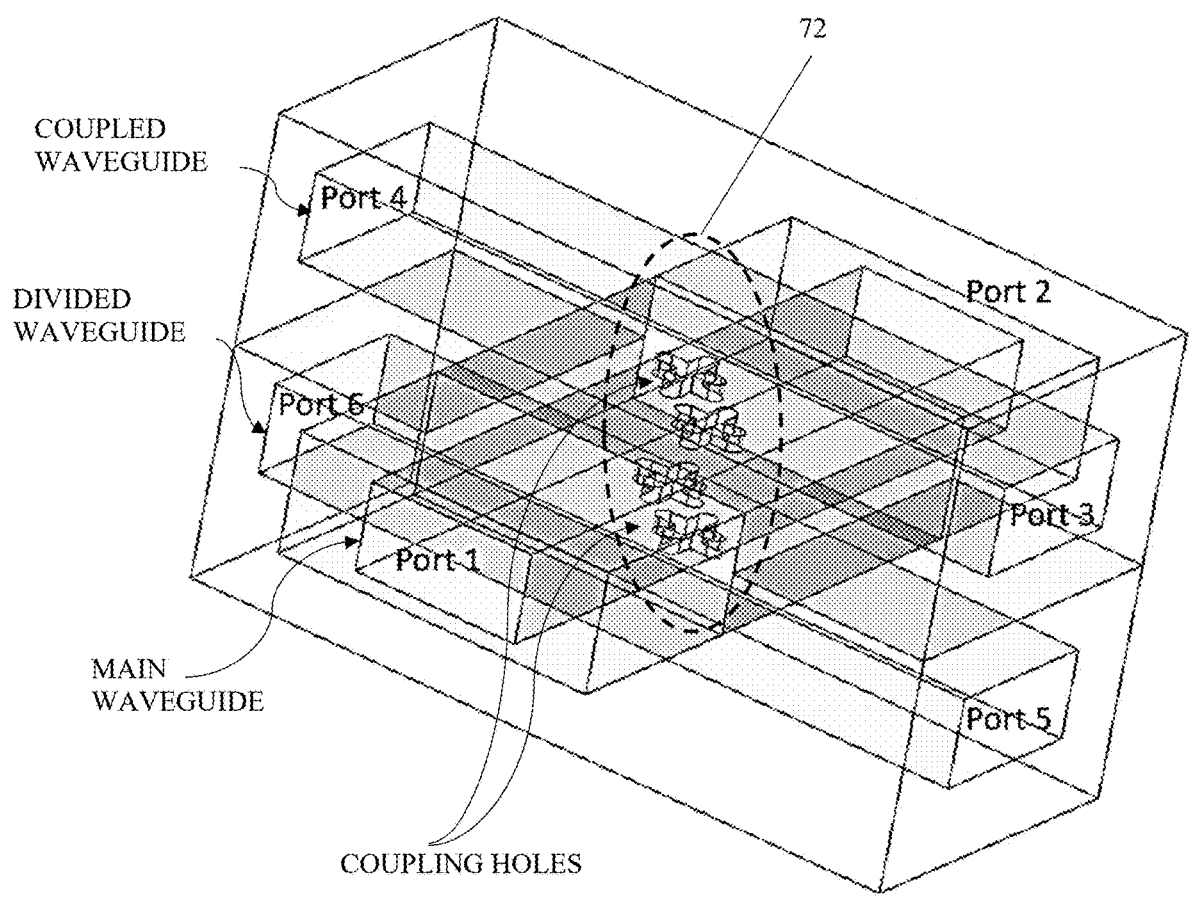
FIG. 8 depicts a transparent 3D view of the three waveguides forming the coupler-divider and the position of the coupling holes.

The directional signal coupler-divider uses a set of communicating low loss waveguide sections; waveguides are popular in air-based couplers (see ref. 5 to 7). The advantages offered by this method are twofold: a) it is mechanically simpler than a wire loop line (see ref. 8); b) it offers the possibility to integrate in an in-situ embodiment a divided port. The proper choice of coupling increases the coupled signal and decreases the isolated signal, thus increasing the coupling and directivity at the same time. A second waveguide section 73 attached and coupled either on the same side or diametrical to the first section offers adding a port 5, the divided port (FIGS. 7 and 8) to the coupler-divider combo device.

Figure 4:
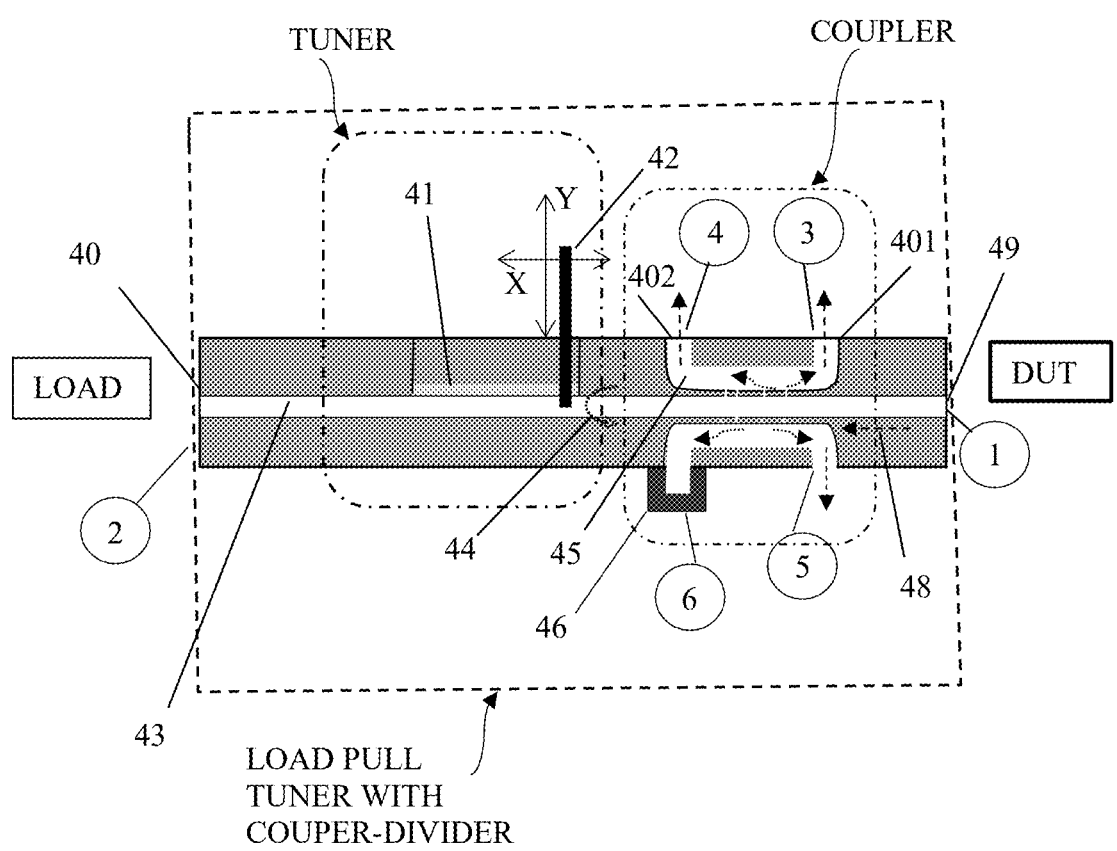
FIG. 4 depicts coupling, isolation, and division mechanism of the waveguide coupler-divider, when the coupling holes are placed on opposite walls of the main waveguide transmission line.
Figure 13:
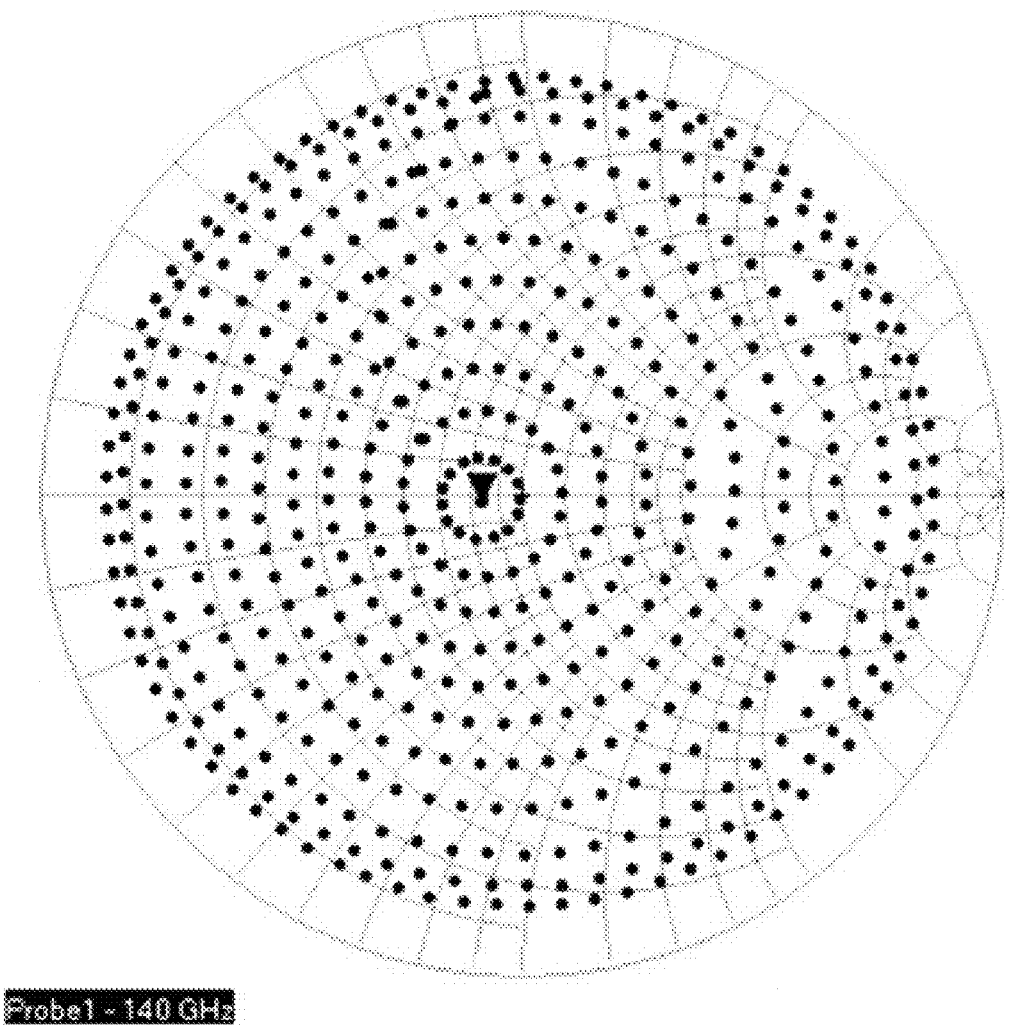
FIG. 13 depicts calibration points at test port of the coupler-divider for a selected set of horizontal and vertical positions of the tuning probe at 140 GHz.

The overall, waveguide-based, tuner-coupler-divider (vector load-pull tuner) assembly, is operational up to at least 330 GHz and its concept is shown in FIG. 4. The waveguide 43 has an input (or test) port 49, connected with the DUT and an output (or idle port) 40 connected with the load. In case of source pull the same configuration applies, instead of the load the idle port 40 is connected to the source; the test port 49 is always connected to either the input or the output of the DUT. The bi-directional waveguide coupler having ports 401 and 402 is inserted between the test port 49 and the impedance tuner, represented here by the conductive tuning probe 42, which is insertable vertically in-and-out of the slot 41 and positioned to a multitude set of vertical positions Y, and movable horizontally along the axis of the waveguide to a multitude of positions X, creating reflection factors covering a large portion of the reflection factor plan (Smith chart) at the test port 49 (FIG. 13). The tuning probe 42 creates a controlled reflection 44, which sends energy back to the DUT. The bi-directional coupler is made using a secondary waveguide section 45, which for the specific frequency range of 110-170 GHz presented here, uses the same standard rectangular size WR-6 (internal dimensions 0.065"×0.035" or 1.651×0.889 mm) as the main waveguide section 43. The unused port 6 of the divider section is terminated 46.

Figure 5:
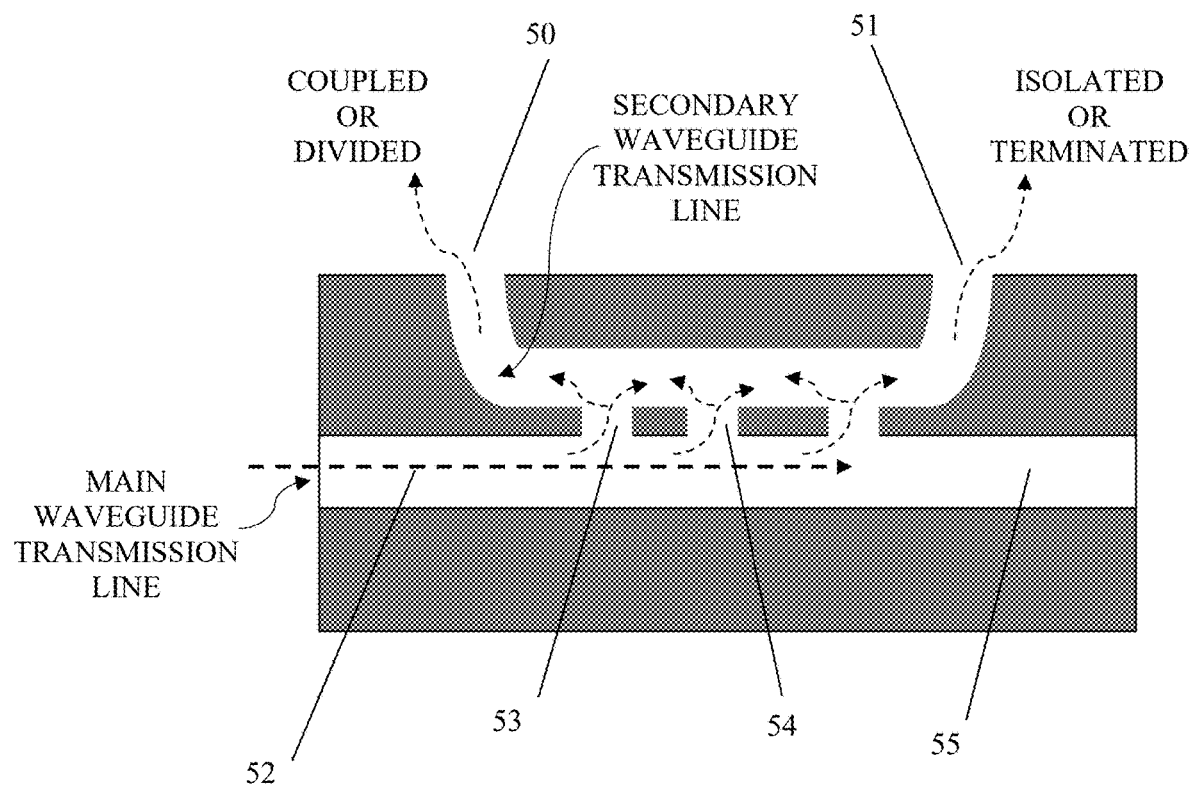
FIG. 5 depicts the detail of the waveguide coupling mechanism.
Figure 6A:
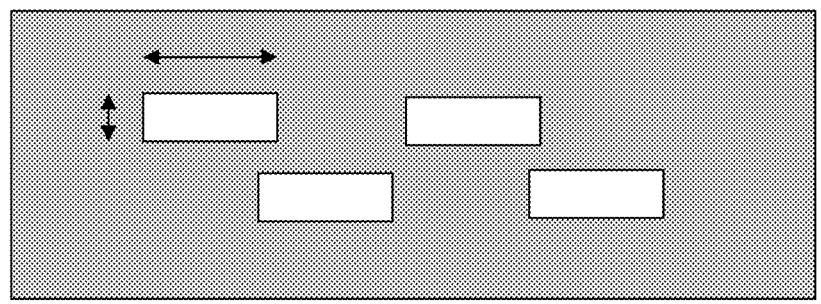
FIGS. 6A to 6C depict various forms of coupling holes.
Figure 6B:
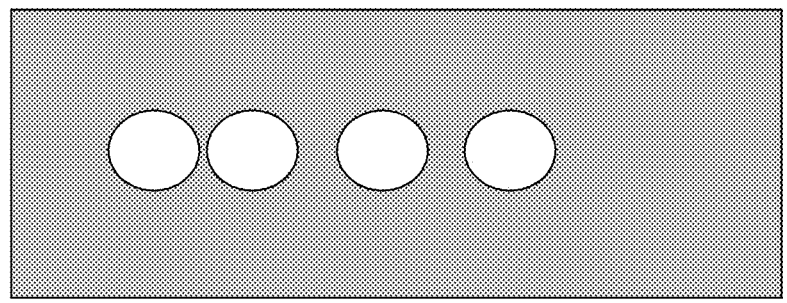
Figure 6C:
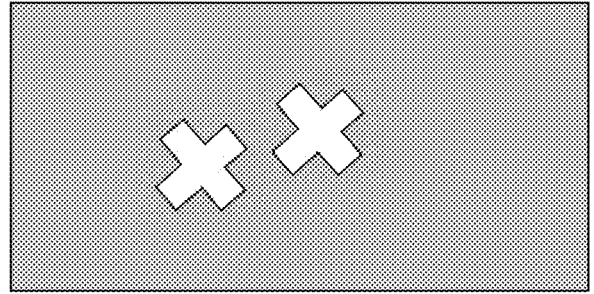

The secondary waveguide 50, 51 is separated from the main waveguide 55 by a thin common wall, which includes a number of communicating holes or openings 53, 54 (FIG. 5) to allow the transfer of energy 52 from the main to the secondary waveguide. The signal leaking through these holes excites electro-magnetic wave propagation into the secondary waveguide, the size and direction of which depends on the form of the holes and their mutual distance and configuration, as shown in FIGS. 6A to 6C; a small portion of the main signal 48, generated by the DUT at port 1, is coupled into the coupler of ports 3 and 4; most of the energy is fed into the forward coupled port 401 i.e., port 3 and a lower amount into the (reverse) isolated port 402, i.e., port 4; the ratio of the two amounts is called "directivity" of the coupler and is a key characteristic of it. The higher the directivity the better the coupler; when the remaining of the signal 48 arrives at the tuning probe 42, it is reflected 44 and returns to the DUT. In this reverse flow direction, though, port 402 is the coupled port and port 401 the isolated port of the coupler. This way the measurement system can detect and determine the incident and reflected power waves from and into the DUT and calculate the effective reflection factor created by the tuner at the test port 49, as well as the delivered power from the DUT. FIG. 5 shows the coupling mechanism in detail: typical dimensions of the slots 53, 54 for the WR-6 tuner covering 110-170 GHz are: width 0.008" (0.2 mm) and length 0.025" (0.64 mm) or roughly 12% of the width of the waveguide broad wall; by coupling a second waveguide section 73 the same way as the first 71, the simple bi-directional signal coupler becomes a coupler-divider. The quantity describing this is called division $D(\Gamma 2)$ as follows equations 1 and 2:

$$D(\Gamma 2)=S51+S52*S21*\Gamma 2/(1-\Gamma 2*S22) \approx S51+S52*\Gamma 2 \qquad \{eq. 3\}$$

If S51=0 then, as before, $D(\Gamma 2)=S52*\Gamma 2$.

Figure 1:
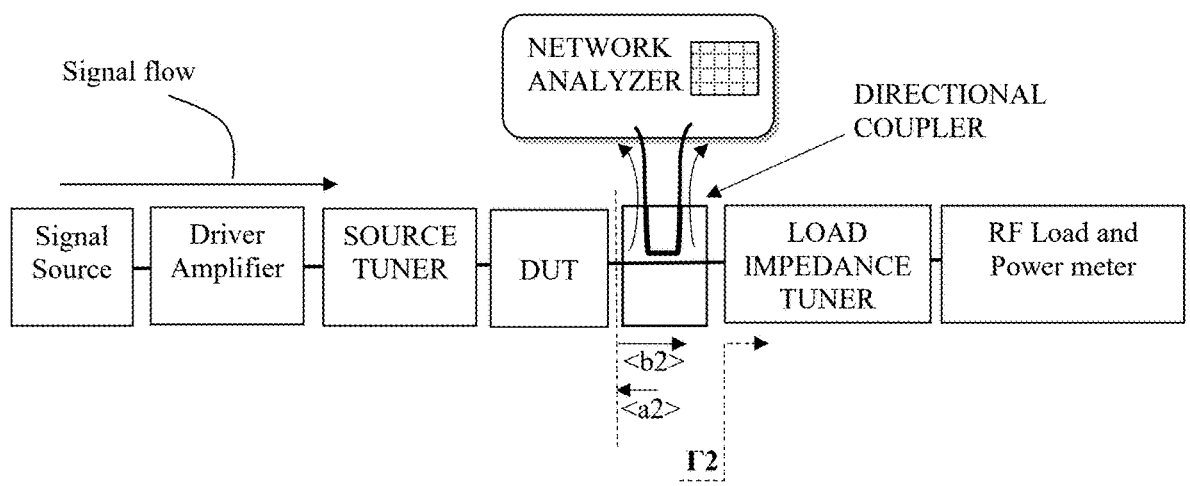
FIG. 1 depicts prior art, a vector load pull test setup for measuring power contours and real time incident and reflected waves and load reflection factor of a DUT, using bi-directional coupler and network analyzer.
Figure 2:
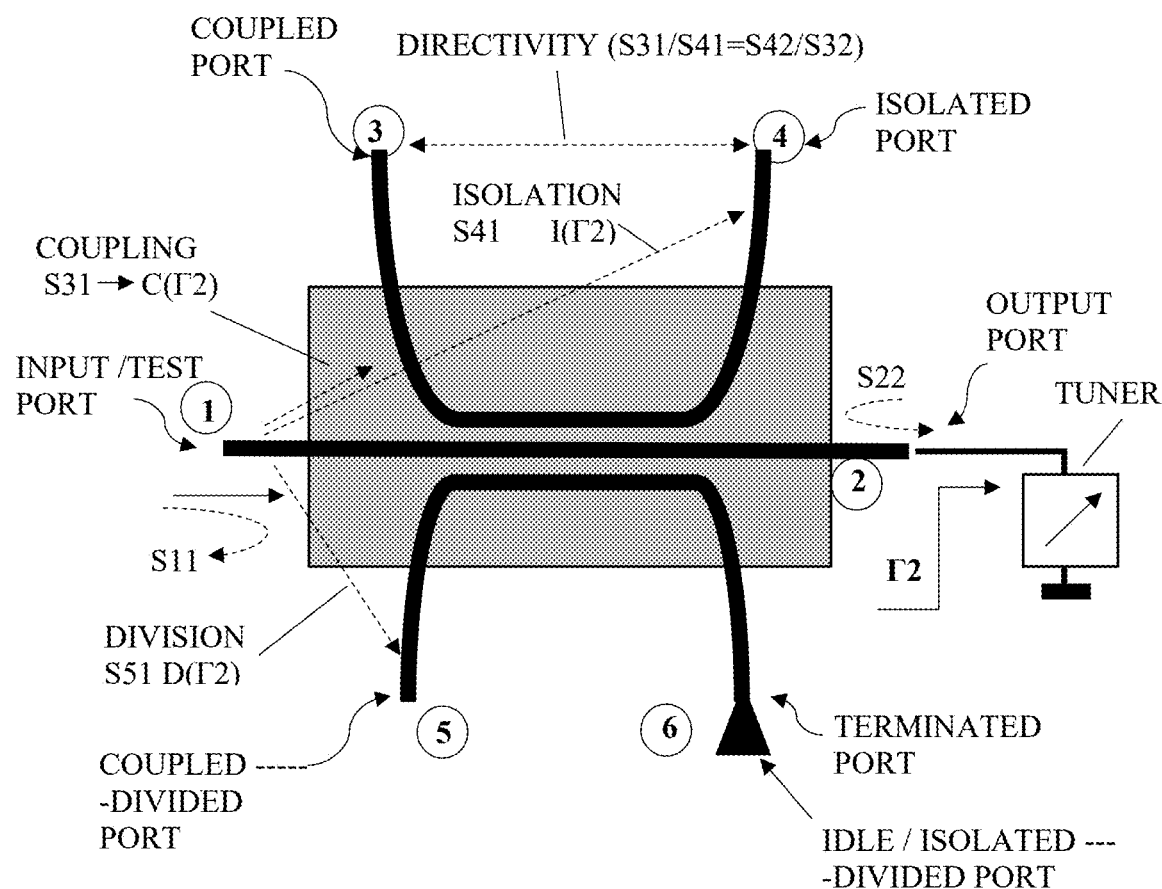
FIG. 2 depicts definition of transmission, reflection, division and coupling ports and s-parameters in a directional coupler-divider.
Figure 3:
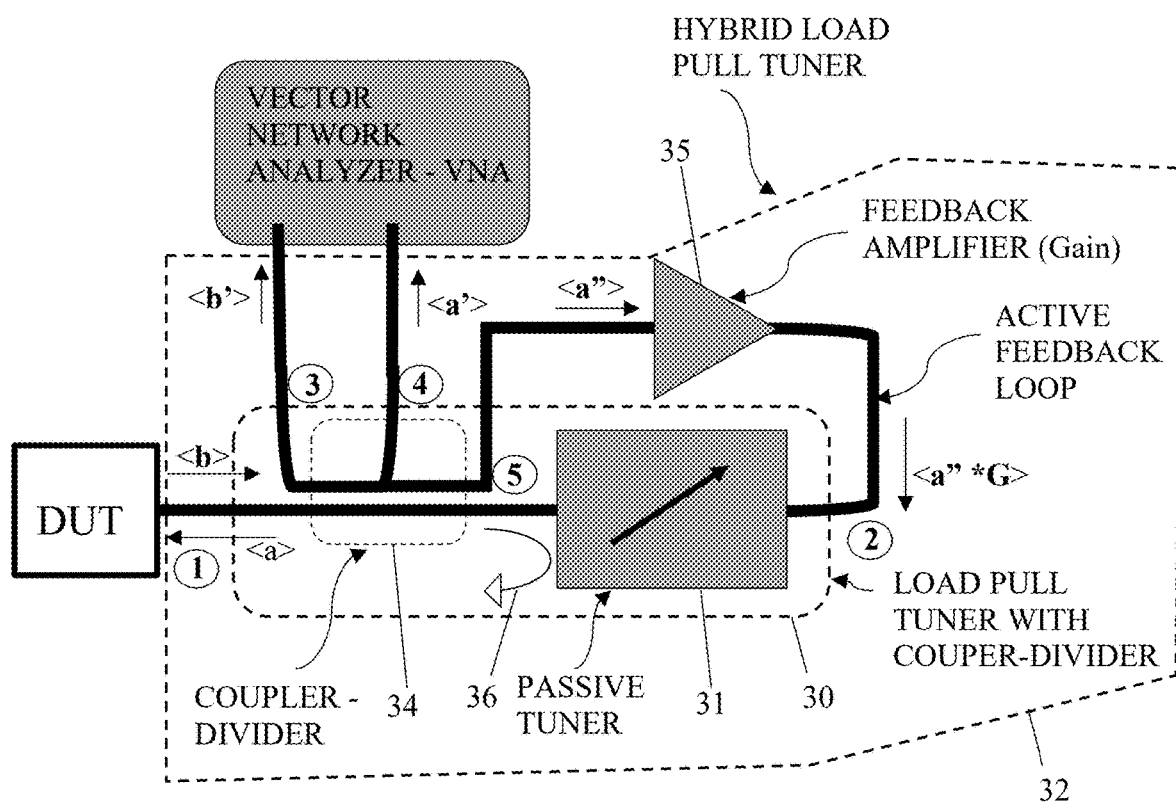
FIG. 3 depicts an embodiment of the signal coupler-divider in a hybrid load pull system (see ref. 9).

The relatively simple design of a directional coupler in waveguide mode of propagations opens the possibility of using a new component, the coupler-divider, in a compact solution of an active or hybrid load pull tuner (FIG. 3); an active load pull tuner is a device which uses reverse signal injection into the DUT to overcome insertion loss between the DUT and the load; this creates a "virtual" load reflection factor <a>/<b> (FIG. 3); the pure active tuner in FIG. 3 is the overall tuner-coupler (item 32 including item 30) without the passive tuner (31). When the passive tuner 31 is added, the overall assembly 32 becomes the hybrid load pull tuner. The hybrid load pull tuner, i.e., the active feedback loop from port 1 through port 5 to port 2 cascaded with the passive tuner 31 back to the DUT (FIG. 3) offers the advantage of radically reduced amplifier 35 power, because the passive tuner acts as a pre-matching (see ref. 10). The operation is as follows: signal <b> from the DUT is injected into port 1; part of <b> is coupled and exits from port 3 of the coupler-divider 34 as power wave <b'> into a first port of a vector network analyzer (VNA); another portion of the incoming signal exits from divider port 5 as power wave <a"> into a feedback amplifier 35 and from there, amplified as <a"*G> back into the DUT via port 2 and the passive tuner 31; the returned signal is sampled by the coupler-divider 34 into port 4 as power wave <a'> and, after proper de-embedding the VNA can calculate <a> and <b> and the actual reflection factor $\Gamma_{Load}$=<a>/<b> seen by the DUT. The power wave <a> is composed by vectorial superposition of the primary reflection 36 at the passive tuner 31 and the traversing active injection <a"*G>.

A practical embodiment of the signal coupler-divider in waveguide technology is shown in FIGS. 7-10; the primary signal-carrying waveguide 70 receives signal 75 at input port 1 and delivers it at output port 2. The secondary waveguides 71 (coupled) and 73 (divided) are attached to and arranged at an angle between 0 and 90 degrees versus the waveguide 70 and communicate with it via a set of holes in the area 72 traversing the walls of the waveguides in the area where they touch; among the various hole shapes possible the configuration of FIG. 6C has been mostly adopted. The structure of FIG. 7 has, therefore, 6 ports 1-6, wherein port 1 is the input port, port 2 the output port, port 3 is the coupled port, port 4 the isolated-coupled port, port 5 the divided port and port 6 is the permanently terminated 74 isolated-divided port.

Figure 9:
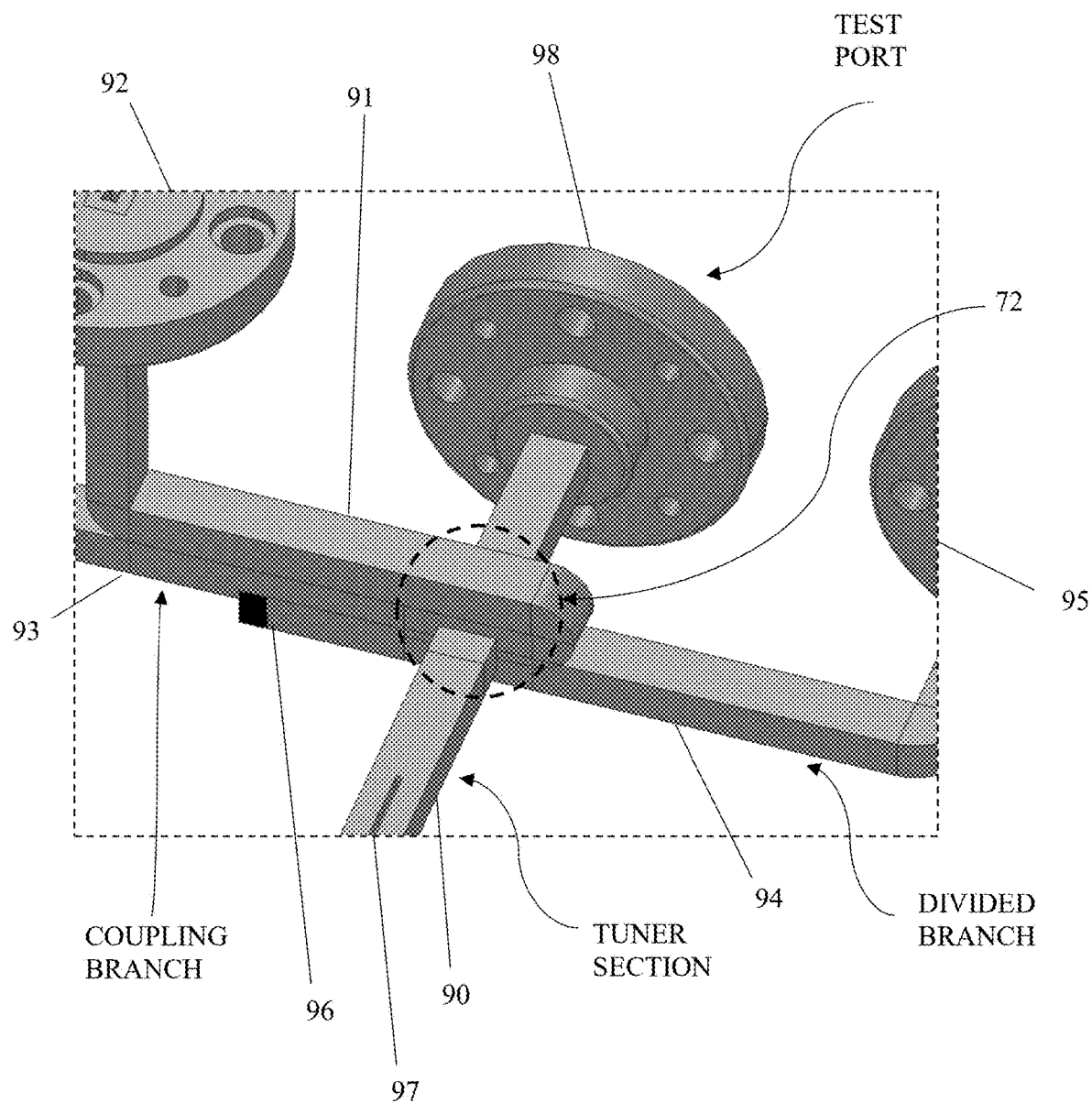
FIG. 9 depicts a detail of the tuning and coupling-dividing section close to the test port.
Figure 10A:
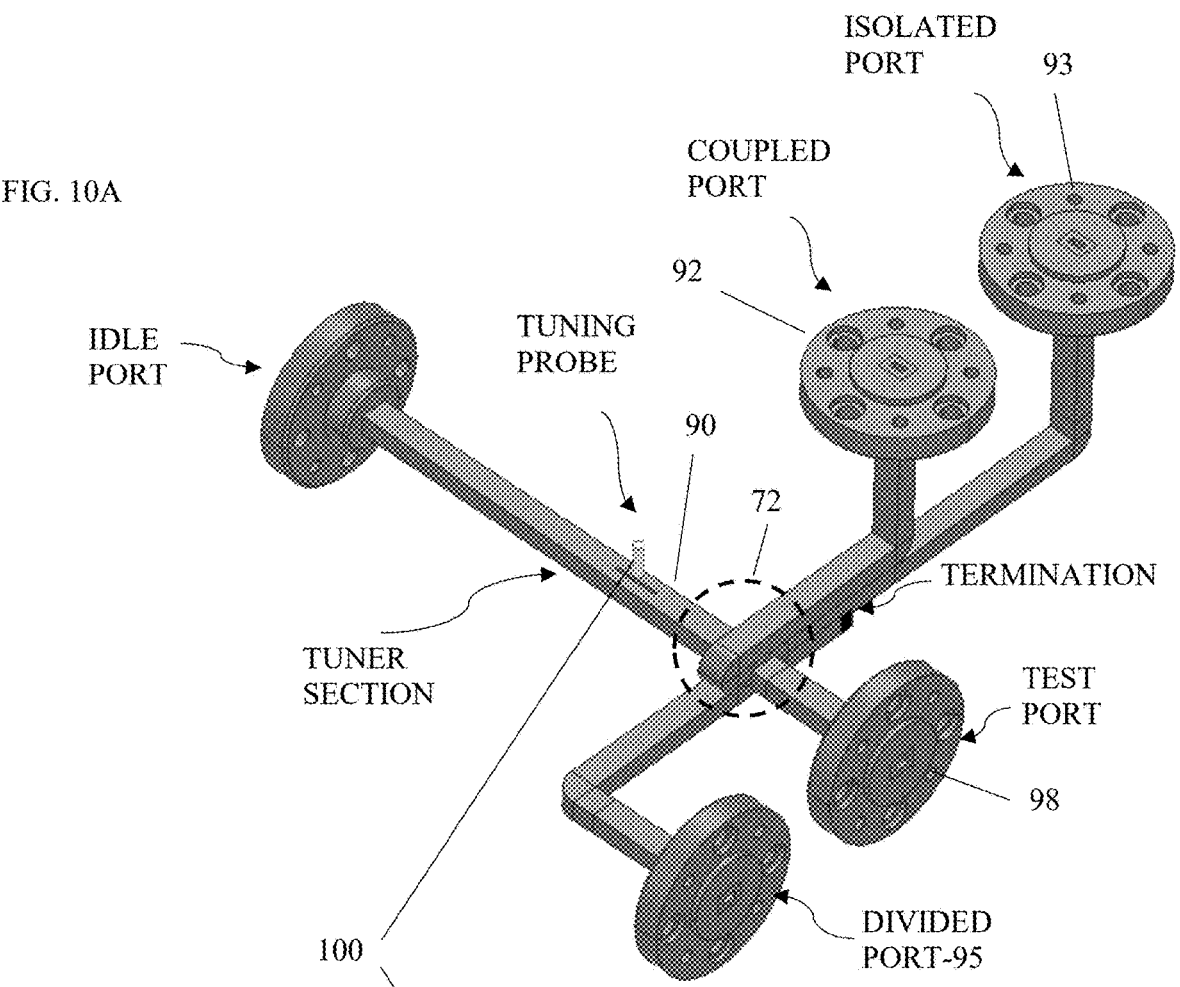
FIGS. 10A through 10B depict embodiment of a waveguide tuner with coupler-divider.
Figure 10B:
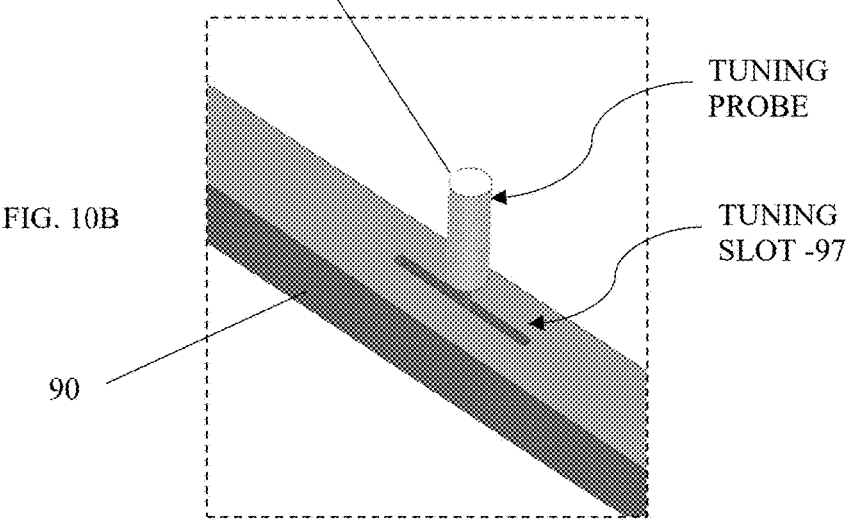

FIG. 9 shows a detail of an overall embodiment of the waveguide coupler-divider and load pull tuner structure of FIG. 10A: in FIG. 9 the coupling between the three waveguides is shown wherein the coupled waveguide 91 reverses direction from the coupled port 92 towards the coupled-isolated port 93, whereas the divided waveguide 94 leads to the divided port 95 and the terminated isolated-divided port 96; the slot 97 in the main waveguide 90 shows where the tuning probe 100 is inserted to create the load pull tuner, as shown in FIG. 10B.

Figure 11:
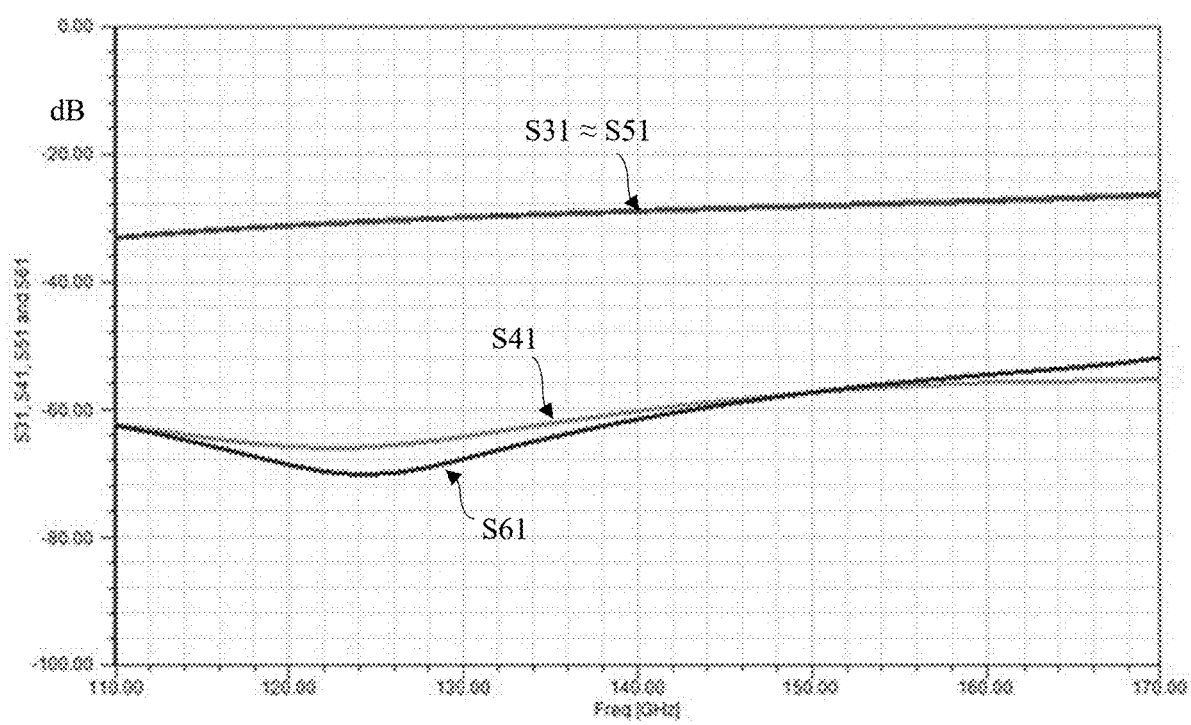
FIG. 11 depicts coupling, directivity, and division performance of the structure of FIG. 10A in the frequency range 110-170 GHz.

The coupling and directivity performance of the waveguide coupler-divider device of FIG. 10A is shown in FIG. 11: the coupling S31 and division S51 factors are defined between input port 1 and coupled port 3 and between ports 1 and 5 (FIG. 10A); the isolation factor S41 and S61 between ports 1 and 4 and ports 1 and 6 are 20 to 25 dB lower in the frequency range 110-170 GHz using waveguide type WR6; combined with the very low insertion loss of the waveguide section between the test port 98 and the tuning probe 100, this allows high dynamic range tuning (FIG. 13).

Figure 12:
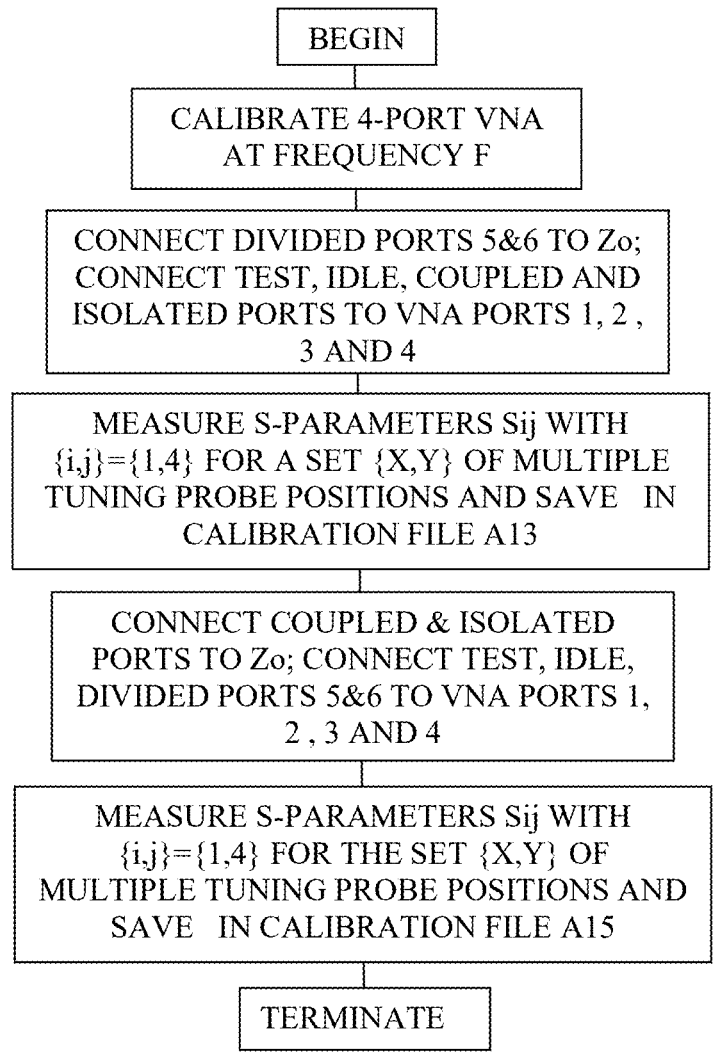
FIG. 12 depicts the flowchart of the coupler-divider calibration using a four-port VNA.
Figure 14:
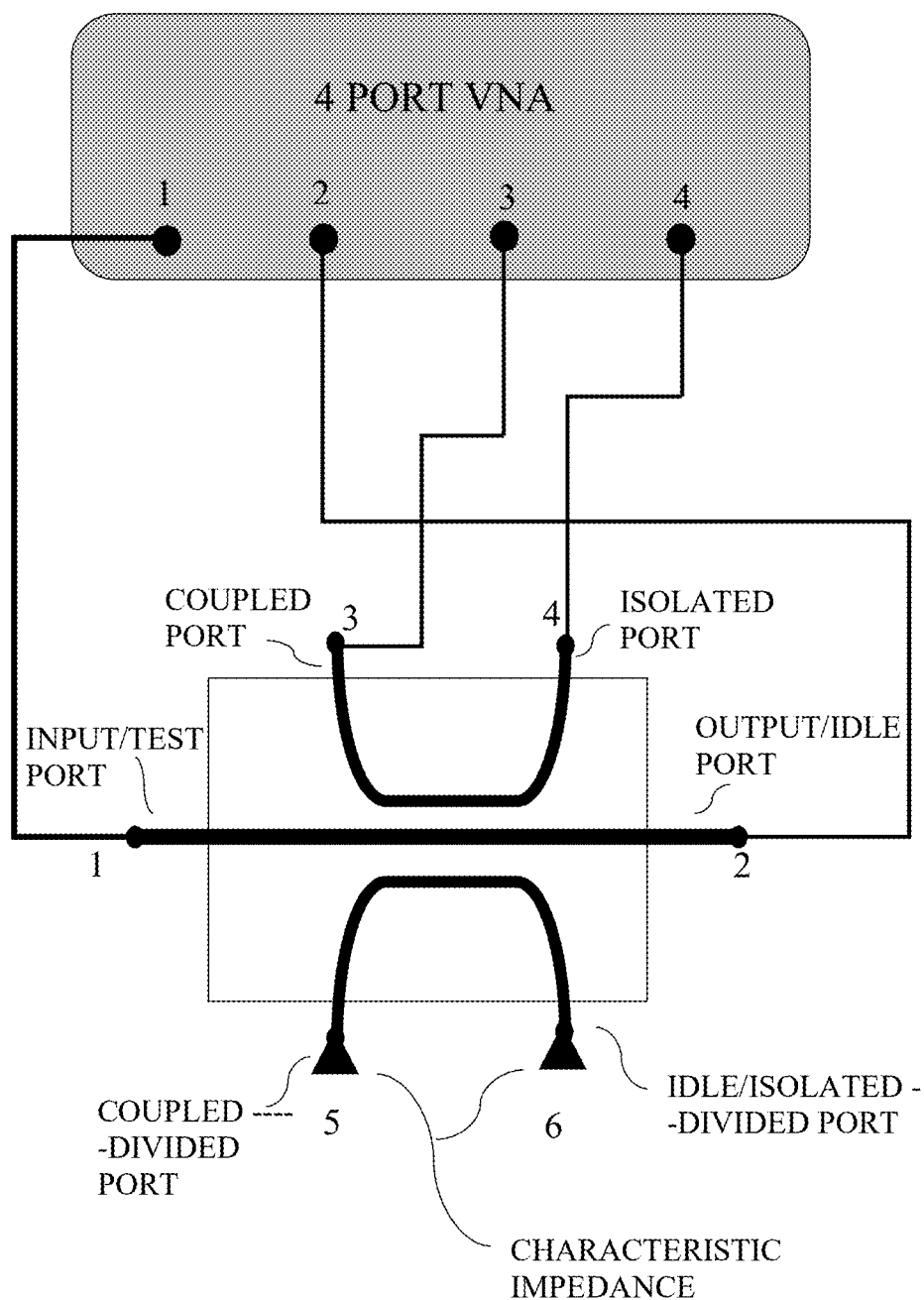
FIG. 14 depicts a calibration setup of the coupler-divided assembly on a 4 port VNA between the test port 1 and the coupled port 3.
Figure 15:
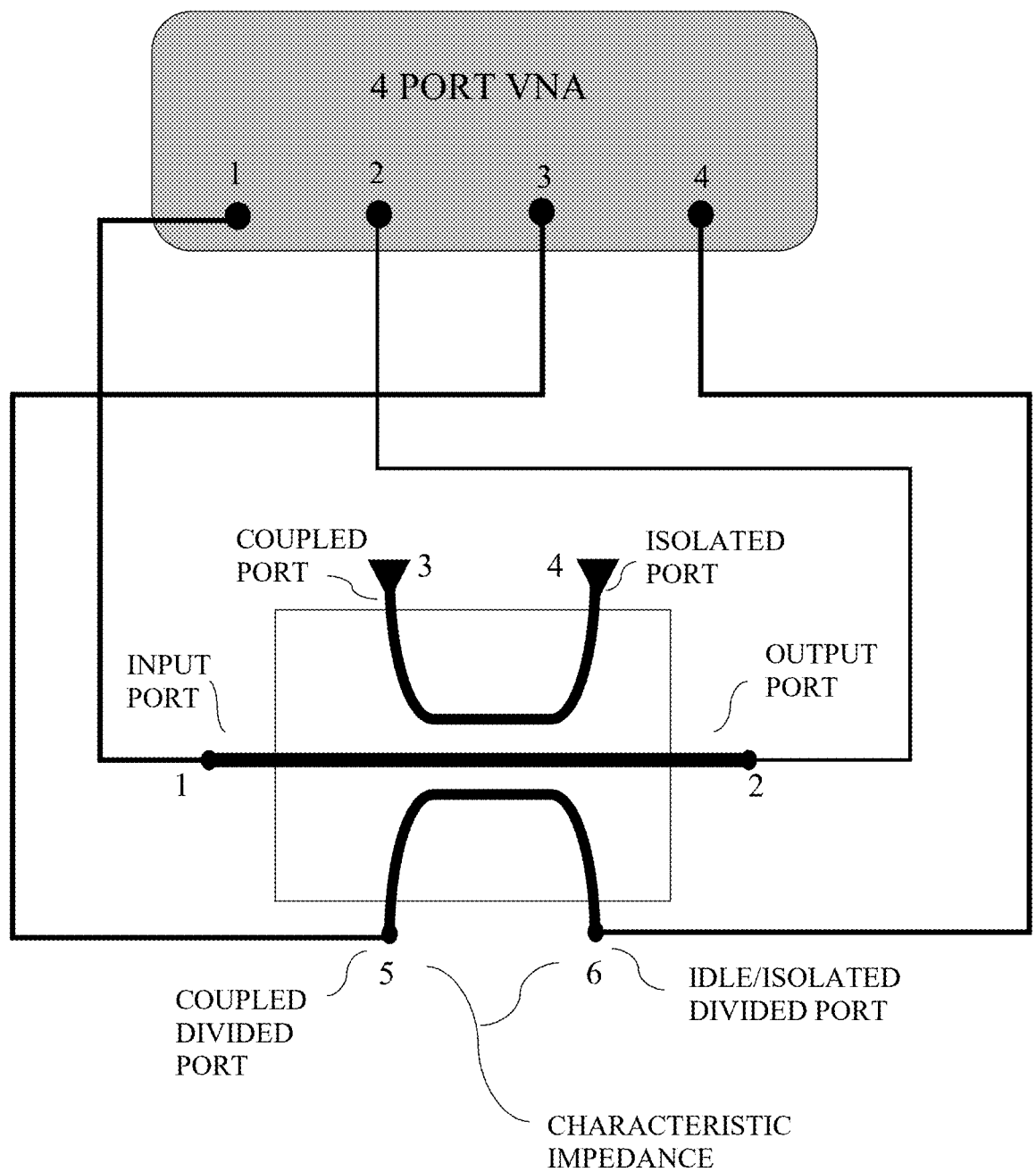
FIG. 15 depicts a calibration setup of the coupler-divided assembly on a 4 port VNA between the test port 1 and the coupled-divided port 5.

To be used in load pull measurements the tuner must be calibrated; because this is a 6-port device, measuring s-parameters for the required multitude of tuning probe positions requires a four port network analyzer, calibrated at the test frequency; the flow chart of the calibration procedure is shown in FIG. 12 and the calibration test setups in FIG. 14 and FIG. 15; whereas ports 1 (test) and 2 (idle) are always connected with ports 1 and 4 of the VNA, the coupler ports 3 and 4 are alternatively to the coupler-divider ports 5 and 6 connected to ports 2 and 3 of the VNA to measure either S33, S31, S32, S34, S44, S41 and S42 or 555, S51, S52, S56, S66, S61 and S62. The coupler-divider ports are connected alternatively to the four VNA ports, at a test frequency F pre-calibrated as follows: first ports 1 to 4 are connected to ports 1 to 4 of the VNA and ports 5 and 6 are terminated with the characteristic impedance Zo of the waveguide, FIG. 14, making sure that no energy is reflected back into the coupler-divider; then the tuning probe is moved to a set M of pre-selected N horizontal X and K vertical Y positions, with M=N×K, along and inside the waveguide slot, in order to create reflection factors as shown in FIG. 13; it shows controlled reflection factors at test port at 140 GHz; the measured s-parameters Sij,ab(X,Y), wherein {i,j}={1,2} and ports {a,b}={1,4} with a≠b, i.e., (1,2), (1,3), (1,4), (2,3), (2,4), are saved in a first file A13 describing the coupler function of the coupler-divider. Then the ports 3 and 4 of the coupler-divider is terminated with the characteristic impedance, and port 5 of the coupler-divider is connected to port 3 of the VNA (FIG. 15). Now the s-parameters are measured for the same (X,Y) positions as before and are Sij,ab(X,Y), wherein again {i,j}={1,2}, but now ports {a,b}=(1,2), (1,5), (1,4), (2,5), (2,4) and saved in a new file A15 describing the divider function of the coupler-divider; isolated-divided port 6 is permanently terminated with the characteristic impedance Zo and any signal power arrived at port 6 is absorbed and none is reflected back into the coupler-divider. In total the (X,Y) columns of the calibration file will include 7 sets of s-parameters, (1,2), (1,3), (1,4), (2,3), (2,4), (1,5) and (2,5), some of which (1,2), (1,4) and (2,4) having been measured twice.

In conclusion the new coupler-divider embodiment is superior in coupling to alternative embodiments and superior in directivity and offers a simple combination of signal coupler and signal divider useful in hybrid load pull solutions. Obvious alternatives and modifications to the herein disclosed general concept of the use of a waveguide coupler with a division branch for making a wideband coupling-dividing and high directivity coupler for hybrid load pull shall not impede in the validity of the invention.

What is claimed is:

1. A waveguide load pull tuner for hybrid load pull comprising:
    a waveguide load pull tuner section, and
    a waveguide directional signal coupler-divider section,
    wherein
        the waveguide load pull tuner section comprises:
            a main waveguide transmission line having
                a test port and an idle port, and
                a slot along a longitudinal axis, which is at least one half a wavelength long at a lowest frequency of operation, and
                a conductive tuning probe remotely insertable perpendicularly into the slot between withdrawal and maximum insertion depth and movable along the slot,
    and wherein
        the directional waveguide signal coupler-divider section comprises:
            two secondary waveguide transmission lines, a first secondary waveguide transmission line and a second secondary waveguide transmission line,
            each said first and second secondary waveguide transmission line each being attached to and coupled electro-magnetically with the main waveguide transmission line via a number of holes traversing the main and the first and second secondary waveguide transmission lines,
    and wherein
        the slot of the main waveguide transmission line, into which the tuning probe enters, is placed between the idle port and the coupler-divider section.

2. The directional waveguide signal coupler-divider of the waveguide load pull tuner of claim 1 comprising:
    an input port, an output port, a coupled port, an isolated port, a coupled-divided port and an isolated-divided port,
    wherein
        the first secondary waveguide transmission line has a coupled port and an isolated port, and
        the second secondary waveguide transmission line has a coupled-divided port and an isolated-divided port.

3. The directional waveguide signal coupler-divider of the waveguide load pull tuner of claim 2
    wherein
        the isolated-divided port is terminated with a characteristic impedance of the second secondary waveguide transmission line section.

4. The directional waveguide signal coupler-divider of the waveguide load pull tuner of claim 1,
    wherein
        the holes traversing adjacent walls of the main and the secondary waveguide transmission lines are round.

5. The directional waveguide signal coupler-divider of the waveguide load pull tuner of claim 1,
    wherein
        the holes traversing adjacent walls of the main and the secondary waveguide transmission lines are rectangular slots.

6. The directional waveguide signal coupler-divider of the waveguide load pull tuner of claim 1,
    wherein
        the holes traversing adjacent walls of the main and the secondary waveguide transmission lines are slots having the shape of a cross.

7. A calibration method for the waveguide load pull tuner as in claim 1, using a four-port vector network analyzer (VNA) having ports 1, 2, 3 and 4, pre-calibrated at a frequency F, comprising the following steps:
    a) terminate the coupled-divided port and the isolated-divided port with characteristic impedance;
    b) connect the test port to port 1, the idle port to port 2, the coupled port to port 3 and the isolated port to port 4 of the four-port VNA;
    c) measure two-port s-parameters Sij with {i,j}={1,3} at the frequency F and a multitude M=N×K of N horizontal positions and K vertical positions of the tuning probe, between ports 1 to 3 of the VNA and save M sets of s-parameters Sij in a calibration file A13;
    d) terminate the coupled port and the isolated port with characteristic impedance;
    e) connect the coupled-divided port to port 3 and the isolated-divided port to port 4 of the four-port VNA;
    f) measure two-port s-parameters Sij with {i,j}={1,5} at the frequency F and the multitude M positions of the tuning probe, between ports 1 to 3 of the VNA and save in a calibration file A15.

8. The waveguide load pull tuner of claim 1,
    wherein
        the main waveguide transmission line and the secondary waveguide transmission lines are mounted parallel to each other.

9. The waveguide load pull tuner of claim 1,
    wherein
        the main waveguide transmission line and the secondary waveguide transmission lines are mounted perpendicular to each other.

10. The waveguide load pull tuner of claim 1,
    wherein
        the main waveguide transmission line and the secondary waveguide transmission lines are mounted at an angle between zero and 90 degrees to each other.

* * * * *